UNITED STATES PATENT OFFICE.

LOUIS ENRICHT, OF NEW YORK, N. Y.

ARTIFICIAL STONE OR CEMENT.

SPECIFICATION forming part of Letters Patent No. 449,619, dated March 31, 1891.

Application filed May 16, 1890. Serial No. 352,072. (No specimens.)

*To all whom it may concern:*

Be it known that I, LOUIS ENRICHT, a citizen of the United States, residing at New York, in the county and State of New York, have invented new and useful Improvements in Artificial Stone or Cement, of which the following is a specification.

This invention relates to a new process for producing artificial stone or cement, which consists in boiling silicate of magnesium in hydrochloric acid, then adding magnesium oxide, and thoroughly mixing the ingredients together, substantially as described.

The following is an example of the manner in which my invention may be carried out.

I take about eight parts, by weight, of magnesium silicate and boil the same in hydrochloric acid of 20° Baumé. About ten parts, by weight, of hydrochloric acid are used, and the boiling is continued for from ten to fifteen minutes, and then I add to the mass about ten parts, by weight, of magnesium oxide and mix the substances thoroughly, thereby generating a silicious oxymuriate of magnesium.

If the composition is to be used as a cement, it must be used while still in a wet or plastic state; but if the composition is to be used for stone it is molded or shaped into the required form and then allowed to dry whereby the mixture becomes set or hard and retains the required form.

Having thus described my invention, what I claim is—

The process for producing artificial stone or cement, which consists in boiling silicate of magnesium in hydrochloric acid, then adding magnesium oxide, and thoroughly mixing the ingredients together, substantially as described.

In testimony whereof I have hereunto set my hand in the presence of two subscribing witnesses.

LOUIS ENRICHT.

Witnesses:
WM. C. HAUFF,
E. F. KASTENHUBER.